United States Patent [19]

Lundeen et al.

[11] Patent Number: 4,802,766
[45] Date of Patent: Feb. 7, 1989

[54] DITHER SIGNAL REMOVER FOR A DITHERED RING LASER ANGULAR RATE SENSOR

[75] Inventors: Merle E. Lundeen, Largo; Wesley C. Sewell, Dunedin, both of Fla.

[73] Assignee: Honeywell Inc., Minneapolis, Minn.

[21] Appl. No.: 945,604

[22] Filed: Dec. 23, 1986

[51] Int. Cl.⁴ .............................................. G01C 19/64
[52] U.S. Cl. ...................................................... 356/350
[58] Field of Search ......................................... 356/350

[56] References Cited

U.S. PATENT DOCUMENTS 4,248,534  2/1981  Elbert ................................... 356/350

Primary Examiner—Vincent P. McGraw
Assistant Examiner—S. A. Turner
Attorney, Agent, or Firm—Robert A. Pajak

[57] ABSTRACT

In the present invention, the output signal of a dithered ring laser angular rate sensor and a signal representative of the resultant dithering of the sensor, are each independently signal analyzed to obtain the frequency components contained in such signals. Data pairs of frequency components of the same frequency are signal processed in a manner to derive a compensation or correction signal representative of the dither frequency component in the readout. In turn, the correction signal is subtracted from the readout signal to provide a corrected readout signal substantially devoid of any dither signal component.

9 Claims, 3 Drawing Sheets

DITHER SIGNAL REMOVER FOR A DITHERED RING LASER ANGULAR RATE SENSOR

FIELD OF THE INVENTION

This invention relates to laser angular rate sensors and specifically to sensors in which a dithering bias is used to minimize the effects of lock-in inherent in such sensors.

BACKGROUND OF THE INVENTION

The behavior of ring laser angular rate sensors is well understood by those skilled in the art. Inherent in such sensors is the phenomena known as lock-in in which counter-propagating laser beams tend to lock together to a common frequency. The lock-in phenomenon causes performance errors which have deleterious effects in navigational systems.

To avoid or reduce the effects of lock-in, the laser angular rate sensor may be biased by dithering techniques such as those shown and described in U.S. Pat. No. 3,373,650 issued in the name of J. E. Killpatrick and assigned to the assignee of the present invention, and herein incorporated by reference. The biasing technique usually referred to as dithering may be implemented in a variety of ways including electro-optical and mechanical schemes. Since these biasing techniques directly affect the behavior of the counter-propagating laser beams, the sensor readout signal will contain not only rate information signals but also contain a signal component directly related to the dithering (alternating bias) of the sensor. This is true whether the readout is mounted directly on the sensor (block mounted) or off of the sensor (case mounted) like that shown in the aforementioned patent. The signal contribution in the readout signal due to dither is herein referred to as the dither signal component. For low noise navigational systems, the dither signal component in the readout signal usually must be minimized or removed to avoid control problems.

Prior art solutions to remove the dither signal component include, among others, notch filters. However, such notch filters generate gain and phase shift disturbances which can affect the stability of control loops. The desirable solution is to remove the dither signal component by generating a correction signal which is substantially equivalent to the dither signal component. This latter approach is taught in U.S. Pat. No. 4,344,706 issued to Ljung et al. Ljung teaches the use of a tracking circuit for tracking the clockwise and counterclockwise components of dither rotation. These dither components are subtracted from the usual readout signal which is responsive to the counter-propagating laser beams of the sensor thereby providing a corrected readout output signal.

Another approach is an electronic dither compensator as taught in U.S. Pat. No. 4,610,543, issued to Ferriss, and U.S. Pat. No. 4,344,706, issued to Ljung et al, both of these patents being incorporated herein by reference. These patents illustrate the up/down count technique of a gyro readout a mechanization for subtracting from these counts that contribution due to dither.

In the latter two mentioned patents, it is of paramount importance to recognize the ability to obtain a signal which is an exact replica of the dither signal component in the readout signal.

BRIEF DESCRIPTION OF THE INVENTION

It is an object of the present invention to provide an electronic dither compensator for a ring laser angular rate sensor in which a dither compensation signal is generated which has phase and frequency characteristics which closely match the dither signal contribution in the sensor readout.

In the present invention, the output signal of a dithered ring laser angular rate sensor and a signal representative of the resultant dithering of the sensor, are each independently signal analyzed to obtain the frequency components contained in such signals. Data pairs of frequency components of the same frequency are signal processed in a manner to derive a compensation or correction signal representative of the dither frequency component in the readout. In turn, the correction signal is subtracted from the readout signal to provide a corrected readout signal substantially devoid of any dither signal component.

DETAILED DESCRIPTION OF THE INVENTION

Figure 1:
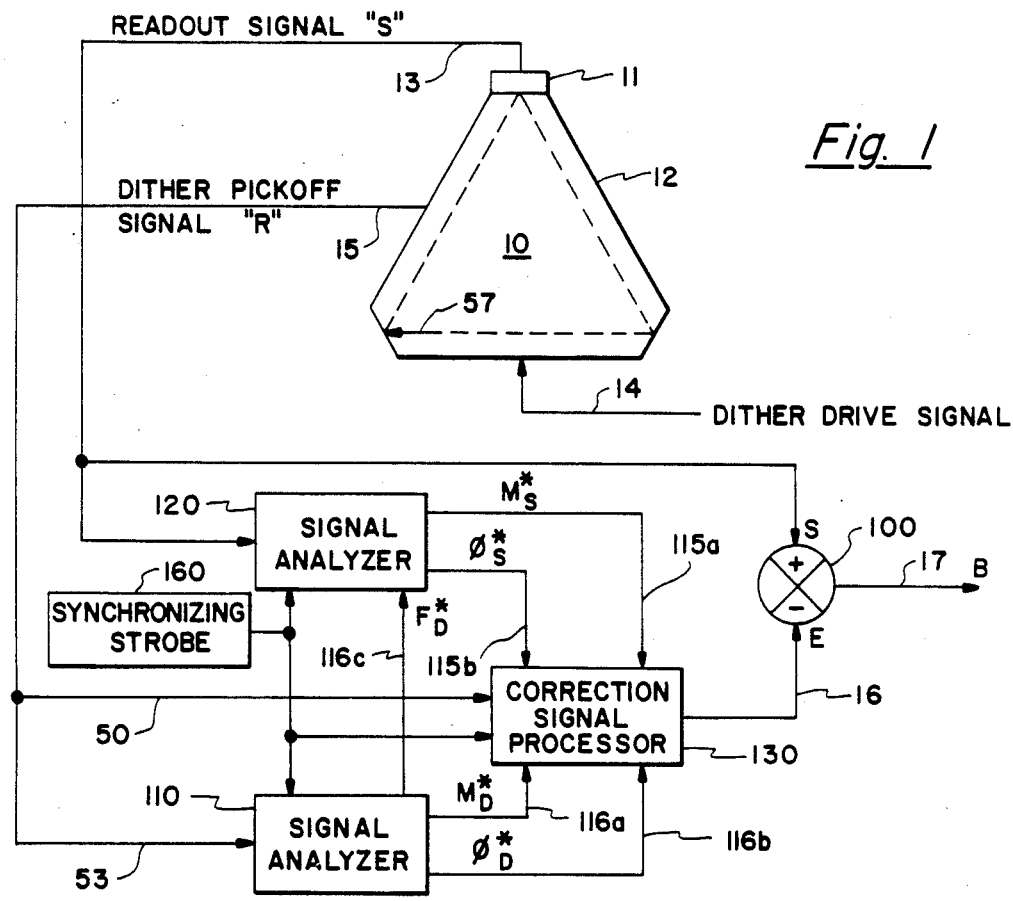
FIG. 1 is a schematic block diagram illustrating an angular rate sensor employing the present invention for removing the dither signal components from the sensor readout.

Referring now to FIG. 1, thereshown is a ring laser angular rate sensor like that shown in the aforementioned patents. Sensor 10 includes a readout mechanism 11 mounted to block 12. Block 12 provides a propagation path for counter-propagating laser beams 7. Readout 11 is responsive to a portion of the counter-propagating laser beams and provides a signal or signals 13, identified as signal "S", representative of the frequency difference between the beams as will subsequently be described in further detail. Sensor 10 includes a dither drive signal 14 for providing the dither or bias as previously described. For example, block 10 may be rotationally oscillated, as shown in the aforementioned patents. A dither spring (not shown) having piezoelectric devices attached thereon can operate to cause the spring to flex and cause block 12 to rotationally oscillate. Furthermore, a piezoelectric device may also be attached to the spring for providing an output signal 15 identified as signal "R" directly related to the actual dither motion of the sensor. The just mentioned piezoelectric output signal "R" is sometimes referred to as the "dither pick-off signal". Herein this signal is referred to as the dither reference signal. The dither reference signal "R" has magnitude and phase at the dither frequency related to the actual dithering of the sensor block. Signal "R" may be either rotation angle or rate, but herein is indicative of rotation angle. The dither reference signal may be obtained by a variety of techniques depending upon the dither scheme that is selected (i.e. optical or mechanical).

A basic patent describing a dither drive is illustrated and described in U.S. Pat. No. 3,373,650, issued to Killpatrick. An improved dither spring and drive mechanization is illustrated and described in U.S. Pat. No. 4,344,706, issued to Ljung et. al. This latter patent also illustrates a mechanization for obtaining the dither reference signal. Further, U.S. Pat. No. 4,445,779, issued to Johnson, shows a dither drive signal and a means for obtaining a dither reference signal. Each of these references being incorporated herein by reference.

It should be noted that a diagram similar to FIG. 1 would be appropriate for describing an electro-optical biasing system including a Faraday cell, and the like.

Readout 11 generally includes a means for combining a portion of each of the counter-propagating laser beams to generate an interference fringe pattern. Readout 11 usually includes at least one photodetector responsive to the interference fringe pattern for providing an output signal indicative of the intensity of the fringe pattern passing the detector. The photodetector output signal may be a signal processed to count the number of fringe changes passing the detector.

As is well known, the output signal of a single photodetector is insufficient to determine fringe movement direction, i.e. sensor rotation direction. Therefore, another means is required to provide a signal indicative of rotation direction. Having at least one photodetector signal and a direction signal is sufficient to determine angular rate and rotation angle information. In FIG. 1, signal 13 is any one or more signals sufficient to indicate and determine sensor rotation by subsequent signal processing.

Readout 11 may be like that illustrated and described in U.S. Pat. No. 4,536,087, issued to Shernoff. The read out signal "S" may be a single signal line or a plurality of signal lines. Within the scope of the present invention, signal "S" may be either an analog or digital signal or other means for providing the intended function U.S. Pat. No. 3,627,425 shows the use of two detectors for generating counts or pulses on separate signal lines which in turn are counted by a reversible counter. The output count in the latter mentioned patent contains information about the inertial rotation as well as the dither signal component. It should be noted that the last named patent also shows circuitry for achieving removal of the dither signal component. These latter mentioned patents are also incorporated herein by reference. There are, of course, a variety of readout 11 implementations to provide the intended function of signal 13. Details of both techniques are particularly described in U.S. Pat. No. 4,610,543 issued in the name of Ferriss, and is incorporated herein by reference.

It should be understood that either mechanical or optical biasing or dithering of the counter-propagating laser beams directly affects the number and rate of fringe changes passing the photodetector, and so directly affects readout signal 13. Therefore, the observed rotation rate and the rotation angle are directly affected by dithering due to the dither signal component. If the sensor is dithered in any manner as already described, then signal 13 will include a dither signal component.

The apparatus shown in FIG. 1 in accordance with the present invention provides an open-loop system for removing the dither signal contribution or component from the sensor readout signal, identified as signal "S", and obtaining a compensated sensor output signal substantially devoid of a dither signal component due to dithering. Thereshown in FIG. 1 is a difference means 100 for subtracting a correction signal, identified by the letter "E" on signal line 16, from the sensor readout signal "S". The output of difference means 100, as will be described, is defined as the corrected sensor output signal and is designated as signal "B" on signal line 17. Signal B is characteristic of the difference between the readout signal "S" and the correction signal "E" thereby providing a sensor output signal "B" having any dither signal component substantially removed.

The following discussion will briefly describe the mathematical relationships between the sensor readout signal S, the dither reference signal R, the correction signal E, and the corrected sensor output signal B.

The readout output signal S may be mathematically expressed by:

$$S = K \sin(\omega_d t + \phi_d + \psi) + \int f(t) dt \quad (1)$$

The right hand term of equation (1) represents the inertial motion which is to be measured by the sensor. The first term on the right side of the equality sign represents the dither signal component in signal S which is caused by the dither motion of the sensor. This latter term is considered an error term. Referring to FIG. 1, if signal E can be made equal to this latter expressed error term, output signal B will be equal to the actual motion which is to be sensed by the sensor without any dither signal component.

The error signal component E can be rewritten as follows:

$$\begin{aligned} E &= K\sin(\omega_d t + \phi_d + \psi) \\ &= K[\sin(\omega_d t + \phi_d)\cos\psi + \cos(\omega_d t + \phi_d)\sin\psi] \end{aligned} \quad (2)$$

For small values $\psi$, equation (2) reduces to:

$$E = K[\sin(\omega_d t + \phi_d) + \psi\cos(\omega_d t + \phi_d)] \quad (3)$$

For sinusoidal dithering motion, the error term is the sine function of the dither frequency $\omega_d$. The phase angle $\phi_d$ represents the phase shift of the actual dither input to the sensor. Lastly, the term $\psi$ represents the phase difference between the dither input signal and that obtained by the readout signal.

The dither pick-off signal R may be mathematically represented as:

$$R = A \sin(\omega_d t + \phi_d) \quad (4)$$

Equation (4) may be substituted into equation (3) to become:

$$E = K\{R/A + \psi[1 - (R/A)^2]^{\frac{1}{2}}\} \quad (5)$$

In equation (5), there are two unknowns. These unknowns are the amplification of the error term "K" and the phase angle $\psi$. The value of R is the actual measurement of the dither pick-off signal. In the present invention, these latter two unknown terms may be empirically determined from the frequency characteristics of both the readout signal S and the dither pick-off signal R in a manner as will now be described.

Referring again to FIG. 1, the dither pick-off signal R is presented to signal analyzer 110 and readout signal S is presented to signal analyzer 120. Signal analyzers 110 and 120 are substantially identical and so only signal analyzer 110 will be described. The purpose of the signal analyzers is to break down the input signal into a plurality of frequency components whose sum represents the input signal. Each frequency component associated with a particular frequency includes a data pair consisting of the amplitude of the frequency component and the phase of that frequency component relative to the remaining frequency components.

Signal analyzers are well known in the art, and a brief description of such analyzers is presented in Van Nostrand's Scientific Encyclopedia, 5th Edition, page 2064, which is incorporated by reference. Techniques employed in signal analyzers include, among others, (1) Fourier transformation, i.e., Fourier analyzer; (2) real-time spectrum analyzer; (3) spectrum viewer; (4) spectrum analyzer; and (5) wave analyzer. Any one of the analyzers as aforementioned and the like is within the scope of the present invention to be used as a signal analyzer.

The preferred embodiments of the invention, as will be illustrated, utilize a Fourier analyzer, specifically a Fast Fourier Transform Analyzer. In a Fourier analyzer, any sinusoidal or non-sinusoidal periodic signal has sinusoidal components predicted by the mathematical Fourier series equation. The Fourier analyzer processes the input signal by a digital computer to transform the signal into frequency domain components with both phase and amplitude information. Equation (6), which follows, mathematically represents the output results of a Fourier analyzer.

$$\text{Fourier signal} = \frac{A_0}{2} \sum_{n=1}^{\infty} A_n \sin(2\pi n f_0 t) + B_n \cos(2\pi n f_0 t) \quad (6)$$

The amplitude and phase of each frequency component may described as follows:

$$\text{amplitude} = M_n = [A_n^2 + B_n^2]^{\frac{1}{2}} \quad (7)$$

and $$\text{phase} = \phi_n = \arctan(A_n/B_n) \quad (8)$$

Figure 2:
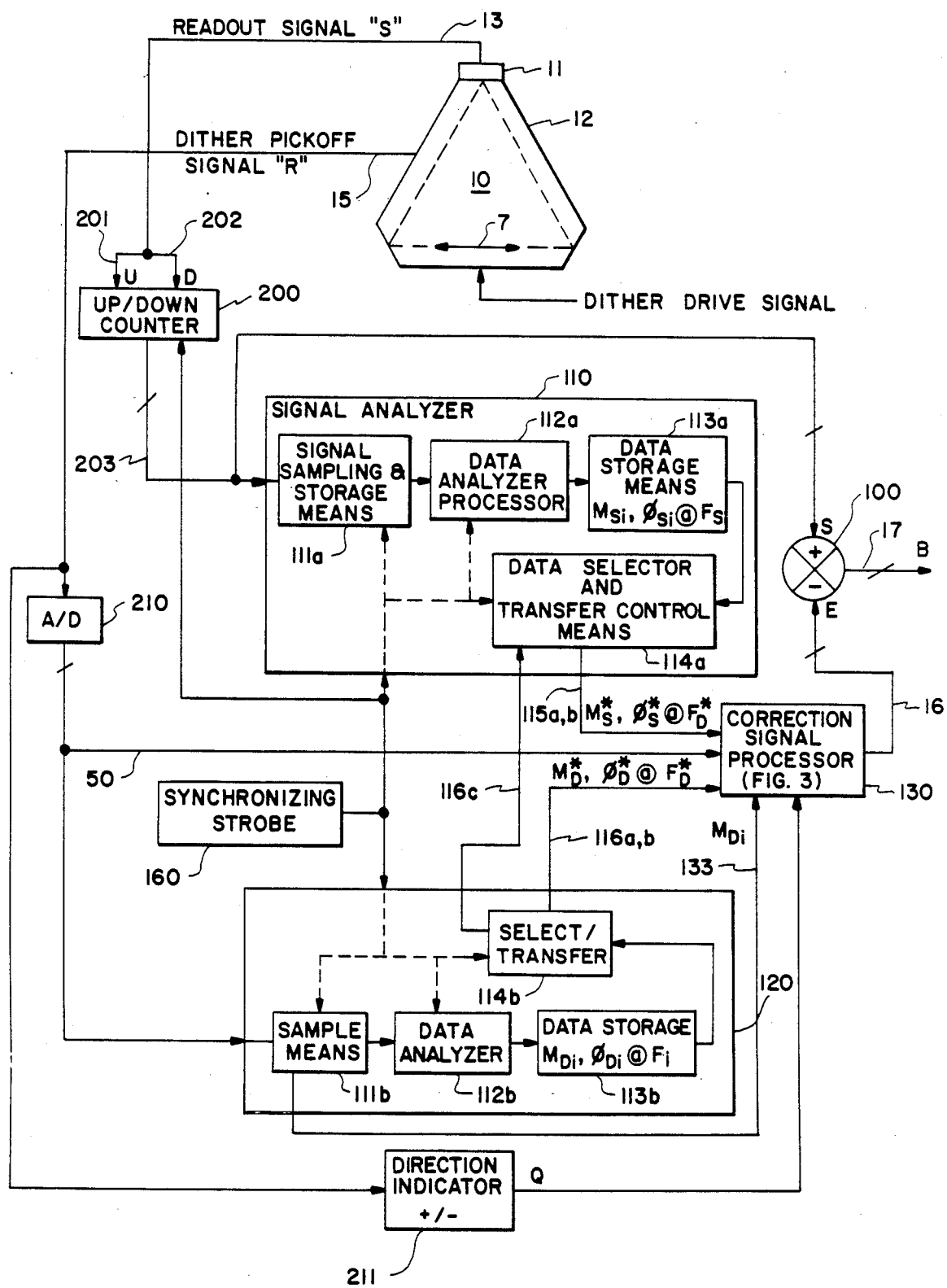
FIG. 2 is a more detailed block diagram of FIG. 1.

Signal analyzers 110 and 120 are substantially the same and so only analyzer 110 will be described. Details of analyzer 110 are illustrated in FIG. 2. Analyzer 120 will have substantially the same components to perform substantially the same functions. Components of analyzer 110 have suffix letter "a", and corresponding components in analyzer 120 have a suffix letter "b". Analyzer 110 may be comprised of a signal sampling and storage means 111a, data analyzing processor means 112a, data storage means 113a, and a data selection and transfer control means 114a. Processor 112a processes the data which is stored in signal sampling storage means 111a. After the signal processing has been completed by processor 112a, the data storage means 113a stores the resultant information as an array of information which includes information from which can be derived an amplitude $M_i$, a phase value $\phi_i$ at a particular frequency component $F_i$.

Data selection and transfer control means allows particular data from data storage means 113a to be made present on one or more information signal lines 115a and 115b which are presented to correction signal processor 130. The output signal lines of analyzer 120 are illustrated as lines 116a, 116b, and 116c.

In the preferred embodiment of the invention, data selection and transfer control means 114b selects the data pair which has the maximum amplitude of the dither pick-off signal R. Specifically, the maximum dither frequency component amplitude is identified as $M_d^*$ having corresponding phase value $\phi_d^*$ at frequency component $F_d^*$. The latter information is presented on signal lines 116a, 116b, and 116c, respectively. The frequency at which the maximum amplitude occurs is presented on signal line 116c. Signal line 116c is presented as an input to the data selection and transfer control means 114a of signal analyzer 110.

The data selection and transfer control means 114a operates to provide on signal lines 115a and 115b signals representative of the magnitude and phase of the data pair representing a frequency component of the output signal S corresponding to frequency $F_d^*$. This signal data pair has magnitude $M_s^*$ having corresponding phase value $\phi_s^*$ at frequency $F_d^*$.

Correction signal processor 130 therefore receives the following inputs from readout signal analyzer 110 and dither signal analyzer 120:

$M_d^*{}_{max}$ and $\phi_d^*$ @$F_d^*$ and $M_s^*$ and $\phi_s^*$ @$F_d^*$

Although FIG. 2 shows several signal lines from the analyzers, it should be recognized by those skilled in art that single line connections could be used for transferring serial input information. On the other hand, the signal lines could also represent a buss or a plurality of lines for transferring parallel data.

Referring to FIG. 1, correction signal processor 130 also receives a signal on signal line 50 representative of the continuously varying dither signal R. With the dither signal input and the magnitude and phase information indicated above, the correction signal processor 130 can then perform the operations as indicated in equation (5). The value of K in equation (5) represents the amplitude of the dither signal component as spilled-over into the readout signal S. The value of K may be determined as a function of the amplitude of the dither signal as determined from the dither pick-off signal R and the ratio of the amplitude values $M_d^*$ and $M_s^*$, as determined by signal analyzers 120 and 110, respectively. The value of K may be mathematically described as follows:

$$K = A(M_s^*/M_d^*) \quad (9)$$

The value of $\psi$ may be determined as a function of the difference between the signal analyzer values $\phi_s^*$ and $\phi_d^*$ as follows:

$$\psi = \phi_s^* - \phi_d^* \quad (10)$$

The value of amplitude A in both equations (4) and (5) may be determined by an RMS (root mean square) method. In the preferred embodiment, the value of A is determined by the summation of dither signal samples as will be subsequently described. Nevertheless, there are a variety of techniques beyond that of the preferred embodiment to obtain the value of the RMS amplitude A.

Having all of the necessary information, correction signal processor 130 performs the mathematical operation of equation (5), and produces the error signal E on signal line 16. Signal E is then subtracted from signal S by difference means 100 to provide the intended output signal B in which the dither component has been removed.

In order to subtract signal E from signal S at the right time, a Synchronizing strobe 160 is utilized. The purpose of strobe 160 is to insure that signal analyzers 110 and 120 are performing the analysis on the same time domain data of signals R and S.

As mentioned earlier, signal analyzer 110 and 120 may be either analog or digital. In the preferred embodiment, signal analyzers 110 and 120 are of a digital variety. Furthermore, the signal analysis performed on dither pick-off signal R and readout signal S is a Fourier analysis. In particular, a Fast Fourier Transform Analysis is performed on the signals. A more detailed description of the preferred embodiment in accordance with the principles of the present invention are illustrated in FIG. 2.

FIG. 2 shows signal S being first presented to a pulse accumulator which is shown as a up/down counter 200. As indicated earlier, the readout signal S may be a pair of signals providing pulses or counts on the pair of signal lines identified as the up-count signal line 201 and down-count signal line 202. Pulses on these two signal lines are mutually exclusive since each pulse represents a discrete amount of angular rotation in one or the other sensor rotation directions. Counter 200 counts up for each pulse on signal line 201, and counts down for each count on signal line 202. The output signal line 203 of counter 200 is presented to sampling and storage means 111a of signal analyzer 120 and to difference means 100. Thus, the output of the up/down counter 200 is continuously in a condition for digital signal analysis. As noted in FIG. 2 the slash passing through the output 203 of up/down counter 200 and any other signal line indicates either a serial data output on a single line or parallel data output on a buss.

The dither pick-off signal R, as illustrated in FIG. 2, is presented to both an analog to digital converter 210 and a direction detector 211. The output of A/D converter 210 is presented to both the signal analyzer 110 on signal line 53 and the correction signal processor 130 on signal line 50 as before. Signal sampling and storage means 111b preferably stores a large number of samples of the output of A/D converter 210. Each sample is synchronized with the output of synchronizing strobe 160. Similarly, signal sampling and storage means 111a stores the same number of samples of up/down counter 200 at exactly the same time as those samples stored in signal sampling and storage means 111b. At exactly the same time, signal processors 112a and 112b operate on the collected samples to perform the fast Fourier transform, as earlier described. The output of the fast Fourier transform processor provides its results to data storage means 113a and 113b corresponding to the readout signal S and the dither signal R respectively.

As earlier described, on command, the data pair of information on signal lines 115a, 115b, 116a, and 116b is presented to correction signal processor 130. Signal processor 130 may be a computer, microprocessor, or the like for performing the intended signal processing as will be described. Specifically, signal processor 130 executes the mathematical steps one through six, as illustrated in FIG. 3, for providing an output signal E on signal line 16 after the execution of all the appropriate steps and under control of strobe 150.

Figure 3:
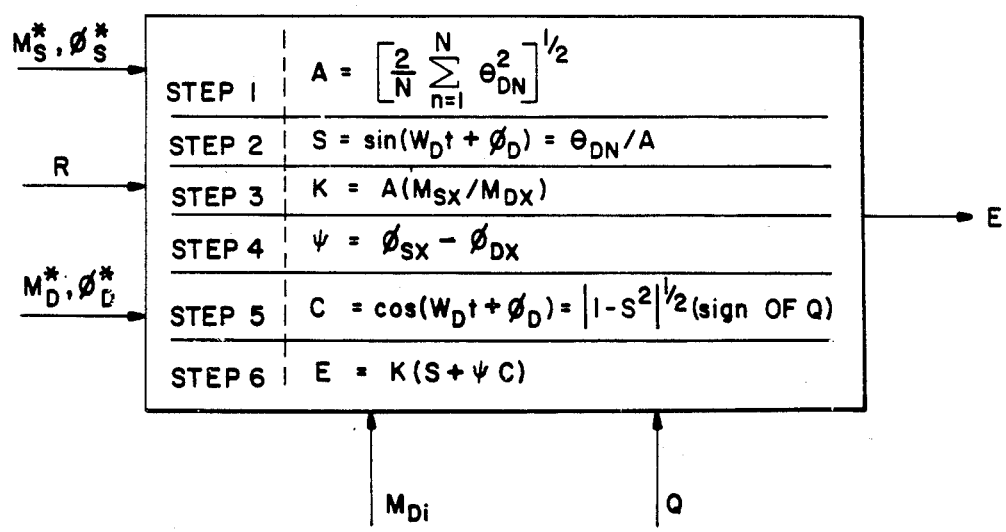
FIG. 3 shows the steps performed by the correction signal processor in accordance with the present invention.

Referring to FIG. 3, step one determines the RMS value of the dither amplitude A by appropriately summing and squaring and averaging the sampled values $\theta_{Dn}$ of the output of A/D converter 210 which are stored in signal sampling and storage means 111b. Data transfer from storage means to processor 130 is shown by signal line 133, the data being the values of $M_i$ for the entire collection sample period.

Step two determines the normalized value of the sinusoidal dither function. The sine value is simply the sampled values $\theta_{Dn}$ of converter 210 divided by the RMS amplitude value A, namely, the result of step one.

Step three calculates the value of K in accordance with equation (9).

Step four calculates the value of $\psi$ based on equation (10).

Step five calculates the cosine function of the same sine function argument as that of the sine function in step two. This is first accomplished by determining the trigonometric function where the square of the cosine value is equal to one minus the square of the sine value. The "sign" of the cosine value is determined by the direction indicator output Q of direction detector 211.

Step six calculates the value of the error signal E in accordance with equation (5).

It should be understood by those skilled in the art that the correction signal E is a constantly changing signal as a function of the value of sine and cosine values as determined in steps two and five. The coefficient A and phase value $\psi$ will be a dynamic data pair. That is, the values of A and $\psi$ will periodically change only after each cycle of collected samples is completed and analyzed. After each collection of data samples, the values of A and $\psi$ can be updated.

Although not shown, the values of A and $\psi$ can be filtered values. That is, A and $\psi$ may be filtered data which looks at previous values of A and $\psi$, and changes these previous values by a very small coefficient times new updated values in a well known manner.

Although FIGS. 1 and 2 show signal analyzers 110 and 120 and correction signal processor 130 as separate elements, each of these elements can be combined into a single computer or microcomputer, microprocessor or the like. Specifically, although shown as separate data analyzing processors 112a and 112b, and correction signal processor 130, these functions may all be performed by a single processor following a predetermined program for obtaining the intended functions as is well known to those skilled in the art.

Although the systems of FIGS. 1 and 2 show an open-loop correction signal system, it is within the scope of the present invention to substitute the output of difference means 100 for the input to signal analyzer 120 to provide a closed-loop correction system. If such a system was utilized, filtered values for the correcting signal E would be required since the signal analyzer 120 would have a greater difficulty in obtaining a sufficient signal to perform signal analysis thereon. This is so, since the signal which is to be analyzed is intended to be removed by virtue of providing a proper correction signal E. Nevertheless, the closed-loop control system as just detailed, is within the scope of the present invention.

The description of the preferred embodiments in accordance with FIGS. 1 and 2 shows a first order correction system. It is also within the scope of the present invention to use higher order correction procedures. Specifically, the data selection and transfer control means 114 may use a different criteria than looking for the frequency component having the greatest magnitude. For example, the selection criteria may be to look at two, three, or more specific magnitudes, and obtaining data information from the readout signal analysis which can be combined into a specific algorithm to obtain the intended error correction readout.

Figure 4:
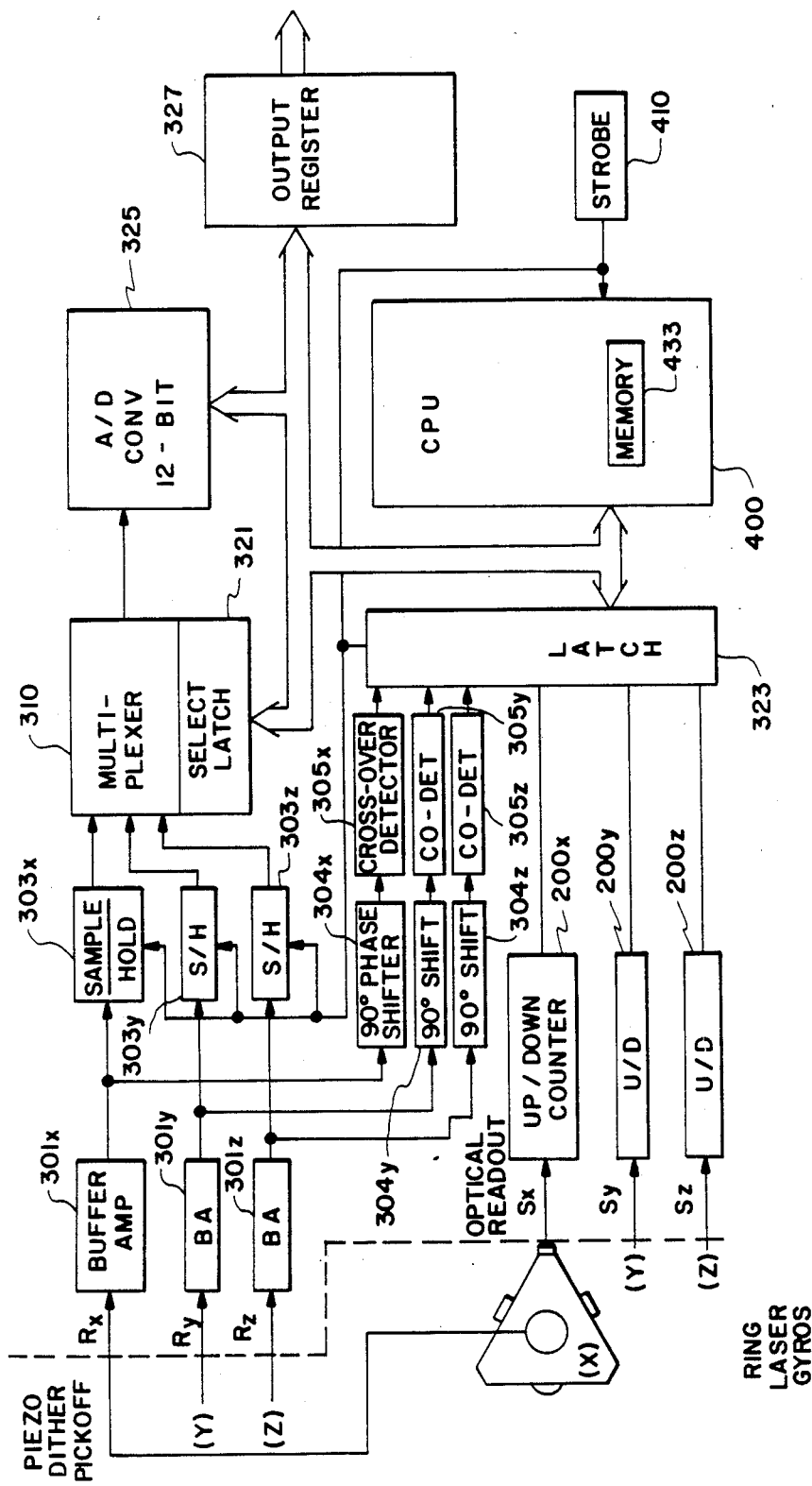
FIG. 4 is a block diagram of a 3-sensor correction signal processor of FIG. 2.

FIG. 4 is a schematic block diagram of another embodiment of the invention showing a computerized ring laser dither system employing three lasers which are commonly found in inertial systems. Specifically, the embodiment shown in FIG. 4 uses a central processing unit (CPU) 400 which performs the appropriate control and signal analysis and correction signal processing functions for each of the sensors in a manner as already described.

Referring to FIG. 4, the dither pick-off R from sensor "X" is presented to a buffer amplifier 301x having its output presented to sample and hold circuit 303x which in turn has its output presented to a multiplexer 310. Similarly, the dither pick-off signal R from the Y sensor is presented to multiplexer 310 through buffer amplifier 301y and sample and hold circuit 303y; and the dither pick-off signal R from the Z sensor is presented to multiplexer 310 through buffer amplifier 301z and sample and hold circuit 303z. The output of multiplexer 310 is connected to analog to digital converter 325 under control of the system strobe 410.

Direction information for signal processing is achieved by use of the outputs from buffer amplifiers 301x, y, z through three 90 degree phase shifters 304x, y, z respectively. Each of the crossover detector outputs are connected to a controlled latch 323 under control of the system strobe 410 for subsequent presentation to CPU 400.

The sensor output signals $S_X$, $S_Y$, and $S_Z$ from each of the three sensors is separately presented to three up/down counters 200x, y, z. respectively. Each of the counter outputs are connected to controlled latch 323 under control of the system strobe 410.

Connected to the central processing unit is a data bus line connected between the select latch 321, latch 323, analog to digital converter 325 and output register 327. The output of register 327 is the corrected sensor information for the individual sensors X, Y, and Z. Central processing unit 400, latch circuits 321 and 323, and sample and hold circuits are all being under control by the synchronizing strobe or system interrupt 410.

Send receive control lines between communicating circuits and CPU clock signals, and the like, have been omitted in the drawings of FIG. 4 to simplify the drawing and enhance the artisans understanding of the invention.

In operation, central processing unit 400 performs all of the correction signal computations for three sensors. The strobe signal causes each of the sample and hold circuits to hold their respective R-signal inputs for each strobe pulse. At the same time, the strobe causes latch 323 to latch the S-signal outputs, and also notifies the CPU of the strobe occurrence. In turn the CPU controls the multiplexer to pass each of the three dither signals through the A/D converter 325 and subsequently store the data in latch 321. Under control of the CPU, the samples are collected in the CPU's main memory 433. After a selected number of samples have been collected, the CPU performs the necessary computations to determine the corrected output E for each of the sensors. In real time, the CPU also provides the function of difference means 100 which subtracts the correction signal E from the sample signal S and places the results in output register 327. Thus, the output data stored in output register 327 contains the corrected output for exactly the same sample time.

While the present invention has been disclosed in connection with preferred embodiments thereof, it should be understood that there may be other embodiments which fall within the spirit and scope of the invention as defined in the following claims. Specifically, it should be recognized by those skilled in the art, that there exists a wide range of analog and digital circuits which may be combined to perform the various functions as intended.

Although a Fast Fourier Transform has been indicated as a preferred technique for obtaining the signal analysis as required in the present teaching, other signal analyzers and/or signal analyzing transforms are intended to be within the scope of the present invention, and is not limited to specifically the Fast Fourier Transform.

Further, the number of samples to perform the Fast Fourier Transform should be sufficient to yield the correct frequency component of the dither signal. In practice of the invention, it was found that 1024 samples are sufficient to perform the signal analysis and yield a proper correction signal E.

The embodiments of the invention in which an exclusive property or right is claimed are defined as follows:

1. A dithered angular rate sensor comprising:
    means for generating counter-propagating waves along a closed-loop path, each of said waves having a frequency related to the rotation of said sensor;
    means for dithering the frequency of at least one of said waves;
    means for producing a dither reference signal related to said dithering;
    readout means responsive to said waves for producing a readout signal indicative of rotation of said sensor, said readout signal including a dither signal component due to said dithering;
    first signal analyzing means for performing a frequency analysis of said dither reference signal and providing frequency component information descriptive of said dither reference signal;
    second signal analyzing means for performing a frequency analysis of said readout signal and providing frequency component information descriptive of said readout signal; and
    signal processing means for deriving a correction signal representative of said dither signal component in said readout signal from (i) said frequency component information descriptive of said dither reference signal and said readout signal, and (ii) said dither reference signal.

2. The apparatus of claim 1 further comprising means for subtracting said correction signal from said readout signal and providing an output signal representative of said difference.

3. The apparatus of claim 1 wherein said first and second signal analyzing means are capable of providing a Fourier frequency component analysis of said dither reference signal and said readout signal respectively.

4. The apparatus of claim 1 wherein
    said first signal analyzing means is capable of providing an amplitude, M, and phase, $\phi$, data pair for frequency components of said dither reference signal; and
    said second signal analyzing means is capable of providing an amplitude, M, and phase, $\phi$, data pair for frequency components of said readout signal.

5. The apparatus of claim 1 wherein:

said first signal analyzer includes,
  means for sampling said dither reference signal at selected sample times,
  means for storing a plurality of said dither reference signal samples, and
  means for operating on said plurality of dither reference signal samples to provide magnitude and phase data information for selected frequency components of said dither reference signal; and
said second signal analyzer includes,
  means for sampling said readout signal at said selected sample times,
  means for storing a plurality of said readout signal samples, and
  means for operating on said plurality of readout samples to provide magnitude and phase data information for selected frequency components of said readout signal.

6. The apparatus of claim 1 wherein:
said first signal analyzer includes,
  means for sampling said dither reference signal at selected sample times,
  means for storing a plurality of said dither reference signal samples, and
  means for operating on said plurality of dither reference signal samples to provide magnitude and phase data pairs for selected frequency components of said dither reference signal; and
  means for determining from said dither reference signal frequency component data pairs a first data pair, $M_d^*$ and $\phi_d^*$ at a first frequency in which the magnitude of said data pair is a maximum as compared to all other data pairs of said dither reference signal frequency components;
said second signal analyzer includes,
  means for sampling said readout signal at said selected sample times,
  means for storing a plurality of said readout signal samples, and
  means for operating on said plurality of readout samples to provide magnitude and phase data pairs for selected frequency components of said readout signal, and
  means for selecting from said readout signal frequency component data pairs a second data pair, $M_s^*$ and $\phi_s^*$, corresponding to a frequency component of said first frequency; and
said signal processing means operates on said first and second data pairs to provide said correction signal.

7. The apparatus of claim 1 wherein said first and second signal analyzing means and said signal processing means comprise portions of a single computing device.

8. The apparatus of claim 6 wherein said correction signal is of the form:

$$E = K\{(R/A) + [1-(R/A)]^{\frac{1}{2}}\}$$

where $$K = A(M_s^*/M_d^*),$$

$$\psi = \phi_s^* - \phi_d^*,$$

$$A = \sqrt{\sum_{n=1}^{N} (\Theta_{dn})^2}, \text{ and}$$

$$R = \Theta_{dn}/A,$$

and
where N is a selected numbers of samples and $\Theta_{dn}$ is a dither sample.

9. The apparaus of claim 6 wherein said correction signal is of the form:

$$E = K(S + \psi C),$$

where $$K = A(M_s^*/M_d^*),$$

$$S = \sin(\omega_d + \phi_d),$$

$$C = \cos(\omega_d + \phi_d),$$

A = average dither reference signal amplitude,
$\psi$ = phase angle related to the two beams,
$\phi_d$ = phase angle between dither input and the readout signal, and
$\omega_d$ = dither frequency.

* * * * *